United States Patent [19]

Shou et al.

[11] Patent Number: 5,600,270
[45] Date of Patent: Feb. 4, 1997

[54] COMPUTATIONAL CIRCUIT

[75] Inventors: Guoliang Shou; Sunao Takatori; Makoto Yamamoto, all of Tokyo, Japan

[73] Assignees: Yozan Inc., Tokyo; Sharp Corporation, Osaka, both of Japan

[21] Appl. No.: 472,461

[22] Filed: Jun. 7, 1995

Related U.S. Application Data

[62] Division of Ser. No. 262,059, Jun. 17, 1994.

[30] Foreign Application Priority Data

| Jun. 18, 1993 | [JP] | Japan | 5-172551 |
| Jun. 18, 1993 | [JP] | Japan | 5-172552 |
| Jun. 24, 1993 | [JP] | Japan | 5-177362 |
| Jun. 30, 1993 | [JP] | Japan | 5-187215 |

[51] Int. Cl.$^6$ ............................. G06F 7/42; G06F 7/44
[52] U.S. Cl. ........................ 327/75; 327/356; 327/361
[58] Field of Search ................................ 327/72, 74, 75, 327/77, 79, 80–82, 88, 334, 356, 361; 341/458, 200

[56] References Cited

U.S. PATENT DOCUMENTS

| 4,031,506 | 6/1977 | Siems | 340/183 |
| 4,183,016 | 1/1980 | Sawagata | 340/347 |
| 4,507,578 | 3/1985 | Matsuda | 307/520 |
| 4,903,028 | 2/1990 | Fukushima | 341/156 |
| 4,989,003 | 1/1991 | Sauer | 327/77 |
| 5,170,076 | 12/1992 | Smith | 327/74 |
| 5,262,686 | 11/1993 | Kurosawa | 327/77 |
| 5,281,860 | 1/1994 | Krenik et al. | 307/243 |
| 5,302,869 | 4/1994 | Hosatani et al. | 327/75 |
| 5,367,266 | 11/1994 | Kang | 327/47 |
| 5,408,142 | 4/1995 | Takatori et al. | 327/91 |
| 5,408,422 | 4/1995 | Takatori et al. | 364/606 |
| 5,416,370 | 5/1995 | Takatori et al. | 327/356 |
| 5,416,439 | 5/1995 | Shou et al. | 327/356 |
| 5,440,605 | 8/1995 | Shou et al. | 327/94 |
| 5,444,411 | 8/1995 | Yang et al. | 327/361 |
| 5,457,417 | 10/1995 | Shou et al. | 327/356 |

*Primary Examiner*—Timothy P. Callahan
*Assistant Examiner*—T. Lam
*Attorney, Agent, or Firm*—Cushman Darby & Cushman Intellectual Property Group of Pillsbury; Madison & Sutro LLP

[57] ABSTRACT

A computational circuit wherein addition is performed by a capacitive coupling or resistive coupling circuit. A quantizing circuit is realized by plurality of thresholding circuit receiving analog input voltages. Each thresholding circuit includes an inverter and a capacitive coupling circuit.

3 Claims, 11 Drawing Sheets

COMPUTATIONAL CIRCUIT

This is a division of application Ser. No. 08/262,159, filed Jun. 17, 1994.

BACKGROUND OF THE INVENTION

1. Field of the Invention

The present invention relates to computational circuits for calculating addition, multiplication, comparison, quantizing and exponentials of substantially analog values.

2. Description of the Related Art

In conventional digital computers, computations are performed by using many combinations of simple digital logic circuits. Digital computation is accurate and redundant. However, it is limited due to the large equipment costs necessary for high precision manufacturing of digital circuits. Analog computation was frequently used for solving differential equations, but because of the limitations of digital devices noted above, analog computation is now attracting attention. Operational amplifiers are used in conventional analog computation. However, a lot of electric power is necessary for large scale analog computation because it is driven by current. As a result, it is difficult to provide a practical circuit for a large scale complicated calculation.

SUMMARY OF THE INVENTION

Therefore, it is an object of the present invention to provide an analog computational circuit for a large scale and complicated computation. According to the present invention, various combination circuits are proposed in which addition is performed by a capacitive coupling and multiplication is performed by weighting of the capacitive coupling. Multiplication is also performed by means of a logarithmic calculation type circuit for transforming a voltage into a time length, which is also useful for exponential calculation.

DETAILED DESCRIPTION OF THE PRESENTLY PREFERRED EMBODIMENTS

Hereinafter, a first embodiment of a computational circuit according to the present invention is described.

Figure 1:
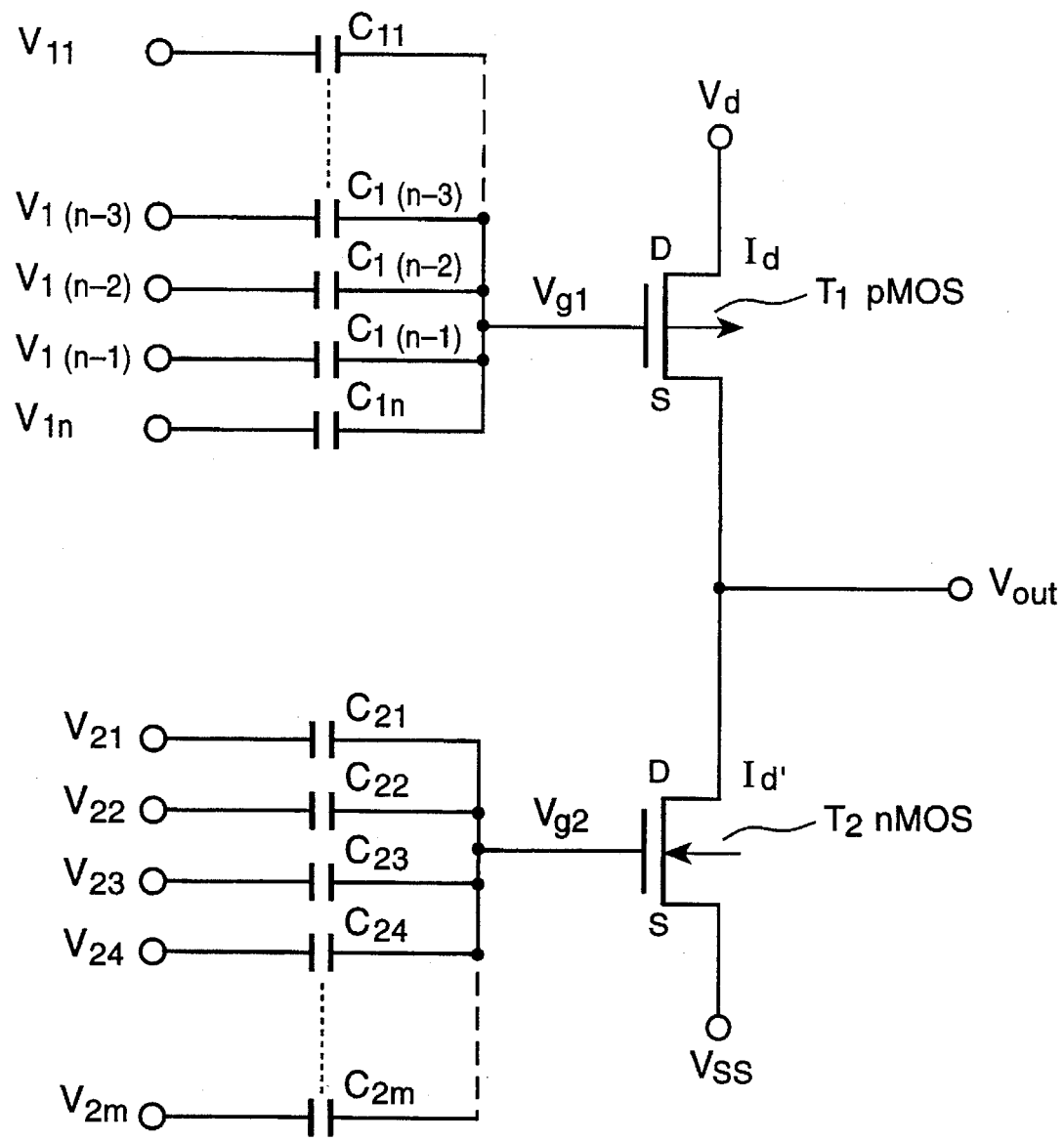
FIG. 1 is a circuit diagram showing the first embodiment of an addition circuit.

In FIG. 1, a circuit for addition and subtraction is shown. The circuit of FIG. 1 models a neural network having excitatory and inhibitory synapses. Inputs on the excitatory synapses cause an output of the neuron to have a high level, such as "1," while inputs on the inhibitory synapses cause the output to have a low level.

Inputs are given as voltage signals V11 to V1$n$ for the excitation synapses and V21 to V2$n$ for the inhibitory synapses. The addition circuit includes an enhancement type pMOS FET transistor T1 and an enhancement type nMOS FET transistor T2. A drain of T1 is connected to a high voltage source Vd. A source of T1 is connected to a drain of T2, and a source of T2 is connected to a low voltage source Vss, for example, ground. A first capacitive coupling is provided for excitatory addition and consists of capacitors C11 to C1$n$ connected in parallel to a gate of T1, each of which receives one input from V11 to V1$n$. A second capacitive coupling is provided for inhibitory addition and consists of capacitors C21 to C2$n$ connected in parallel to a gate of T2, each of which receives one input from V21 to V2$n$. Capacitive couplings perform an adding circuit because the integrated output voltage V' out can be defined as follow:

$$V'out = \sum_i^n C1iV1i / \sum_i^n C1i$$

$$V'out = \sum_i^n C2iV2i / \sum_i^n C2i$$

When, T1 and T2 operate in the saturated area, that is, $$Vd1 \geq (Vg1-Vt1)>0 \text{ and } Vd2 \geq (Vg2-Vt2)>0, \qquad (1)$$

where

Vd1, Vd2 are the drain voltages of T1 and T2, respectively,

Vg1, Vg2 are the gate voltages of T1 and T2, respectively, and

Vt1, Vt2 are the threshold voltages of T1 and T2, respectively.

The current Id and Id' through T1 and T2 are approximately expressed as follows:

$$Id=(k1/2)(W/L)(Vg1-Vt1)^2\{1+\lambda1(Vd-Vout)\} \qquad (2)$$

$$Id'=(k2/2)(W/L)(Vg2-Vt2)^2\{1+\lambda2 Vout\}, \text{ where} \qquad (3)$$

$$k1=\mu n1 Cox1 \qquad (4)$$

$$k2=\mu n2 Cox2=2k1 \qquad (5)$$

wherein

μn1 is the carrier mobility in the channel area of T1,

μn2 is the carrier mobility in the channel area of T2,

Cox1 is the capacitance of the gate oxide layer of T1,

Cox2 is the capacitance of the gate oxide layer of T2,

W is the channel width,

L is the channel length,

λ1 is the index representing the output resistance of T1,

λ2 is the index representing the output resistance of T2, and

Vout it the output voltage between the source of T1 and the drain of T2.

λ1 and λ2 are equal to (1/Va), which corresponds to an inversion of the voltage Vds when Id=0 on the extended line of static performance in the saturated area. It is also called the "channel length modulation effect factor." Since λ1=λ2, both are represented by "λ".

If no current flows from the output terminal, the formulas (2) and (3) are equal to each other. Therefore, $$(k1/2)(W/L)(Vg1-Vt1)^2\{1+\lambda(Vd-Vout)\}=(k1/2)(W/L)(Vg2-Vt2)^2\{1+\lambda Vout\} \quad (6)$$

Formula (6) is simplified by replacing the squared terms, as follows.

$$V1\{1+\lambda(Vd-Vout)\}=2\times V2(1+\lambda Vout) \quad (7)$$

$$V1=(Vg1-Vt1)^2, V2=(Vg2-Vt2)^2 \quad (8)$$

By replacing X=(V2/V1), formula (7) is further simplified.

$$\{1+\lambda(Vd-Vout)\}=2X(1+\lambda Vout) Vout=(1-2X+\lambda Vd)/\{\lambda(1+2X)\} \quad (9)$$

Figure 2:
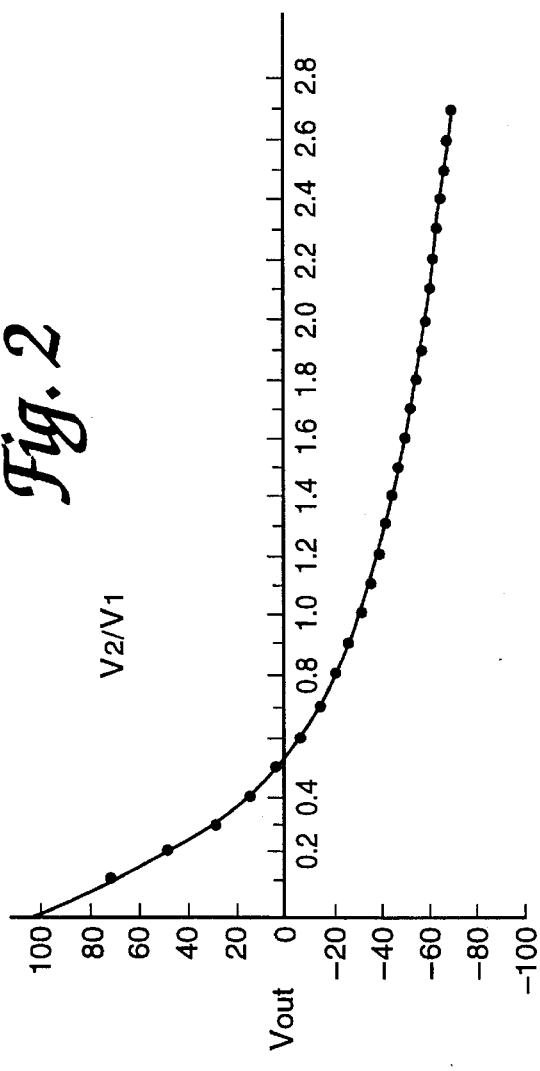
FIG. 2 is a diagram of the input/output characteristics of V2/V1 of the circuit in FIG. 1.

Here, $$Vout=(1+\lambda Vd)/\lambda (X=0) \quad (10)$$

$$Vout=-(1/\lambda)(X\to\infty) \quad (11)$$

and the total performance is shown in FIG. 2.

Next, an inversion of X is defined as Z so that $$Vout=(Z+\lambda Vd-2)/\{\lambda(Z+2)\}. \quad (12)$$

Figure 3:
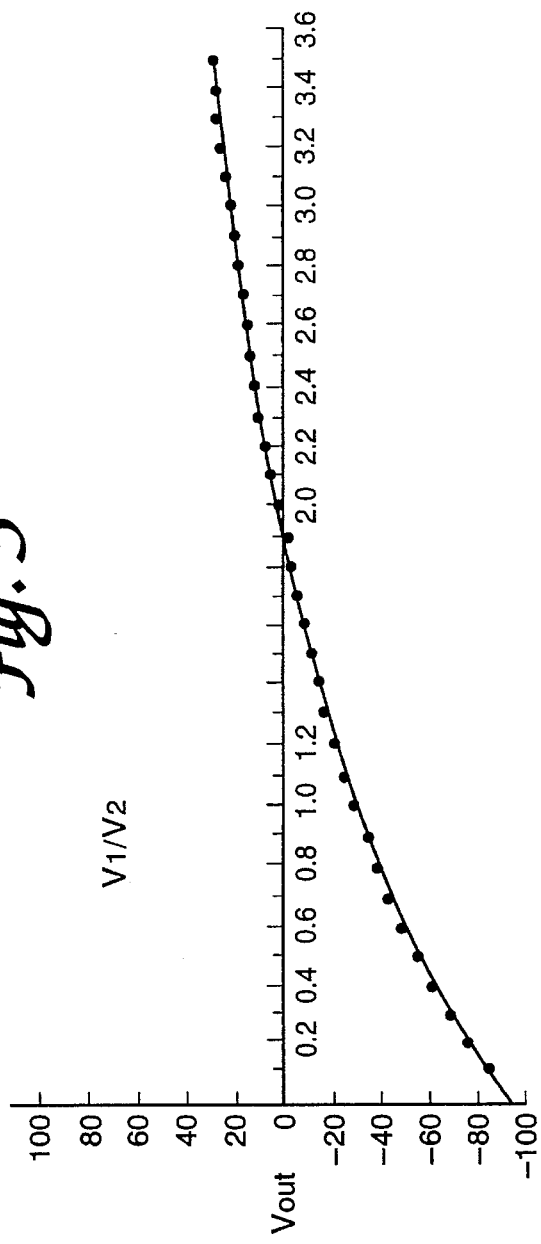
FIG. 3 is another diagram of the output characteristics of V1/V2 of the circuit shown in FIG. 1.

A performance curve of Z is shown in FIG. 3.

From FIGS. 2 and 3, it is apparent that the inclination of Vout is steep when X or Z is small, and less steep when X or Z is large. The proportion of Vg1 to Vg2 or its inversion, that is, the proportion of a summation from Vin, V1(n-1), V1(n-2), V(n-3), . . . , V11, to a summation from V2m, V2(m-1), V2(m-2), V2(m-3), . . . , V21, or its inversion influences Vout more as they become smaller.

Formula (9) is partially differentiated by V1 so that $$(\partial Vout/\partial V1)=\{2X(2+\lambda Vd)\}/\{V1^2(1+2X)\}\geq 0. \quad (13)$$

Formula (9) is also partially differentiated by V2 so that $$(\partial Vout/\partial V2)=\{-2(2+\lambda Vd)\}/\{\lambda V1^2(1+2X)\}\geq 0. \quad (14)$$

When Vg2 is constant, the larger Vg1 becomes, the more Vout increases. Vout converges to the value in formula (10). When Vg 1 is constant, the large Vg2 becomes, the less Vout decreases. Vout converges to the value in formula (11). In the above relationship, Vout cannot become more than Vd or less than Vss. When Vout approaches Vd or Vss, the change rate decreases.

The pMOS FET T1 is energized by the summation of (V11, V12, . . . , Vin) as the gate voltage Vg1 so that Vout is increased. While, by the summation of (V21, V22, . . . , V2n) as Vg2, Vout is decreased.

A neural network is accurately modeled by the addition circuit in FIG. 1. This circuit is rather simple for constructing an artificial neural network. The weight of the synapses in this neural network can be adjusted by adjusting the capacitance values of C1n and C2m. Capacitances in a LSI circuit are easily constructed by shaping a metal layer for wiring and an emitter diffusion layer on both sides of SiO2. The input voltage is provided through capacitances at the gate of a MOS FET, so that the input impedance is high and an electric power is spared. According to the first embodiment, an addition circuit is obtained by a simple, low power circuit with high speed. This embodiment is also suitable for a large scale artificial neural network.

Figure 4:
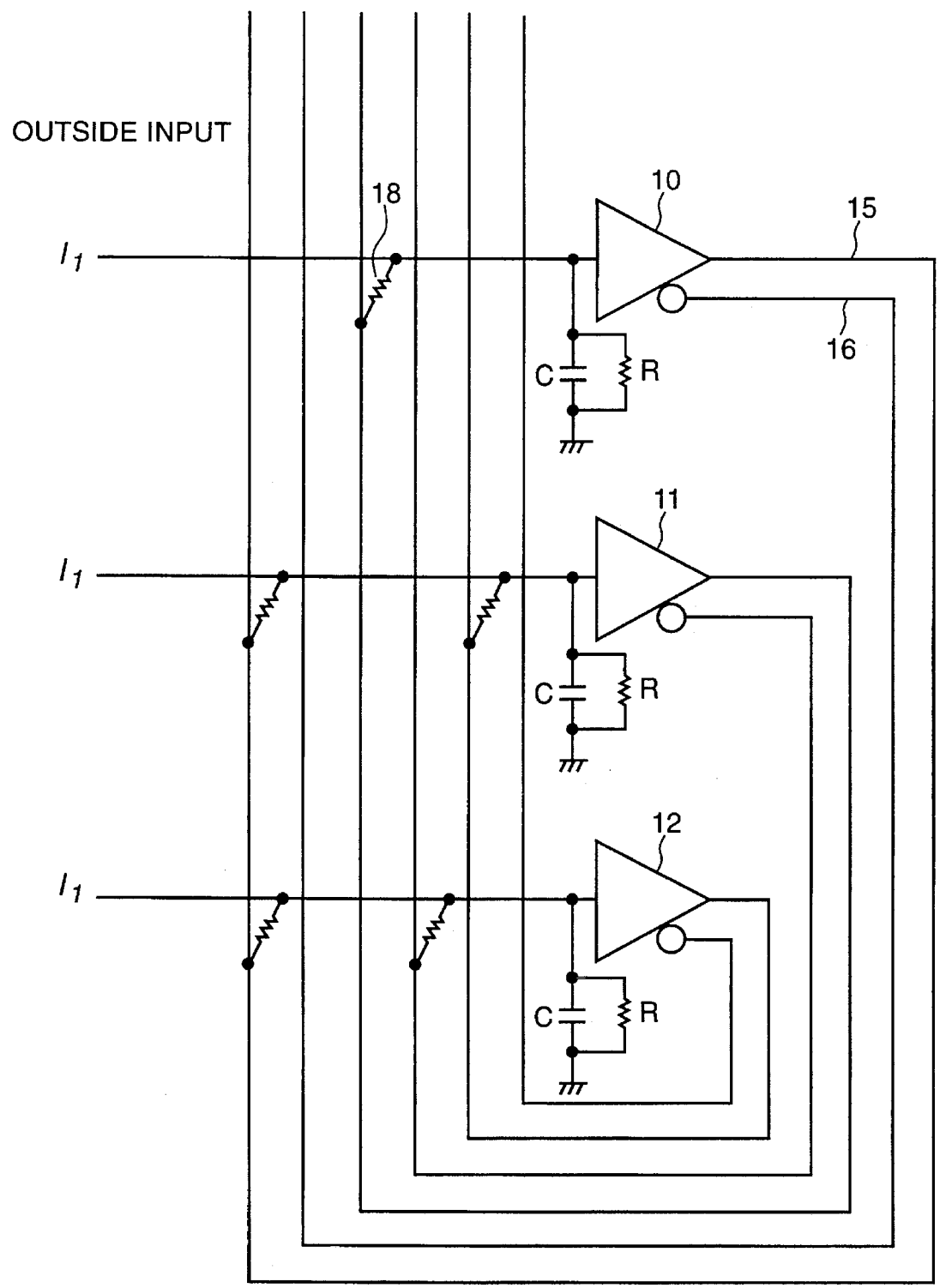
FIG. 4 shows a conventional computational circuit.

FIG. 4 shows one conventional neural network disclosed in the U.S. Pat. No. 4,660,166. In FIG. 4, cell bodies of a neuron consist of operational amplifiers 10, 11 and 12, and axons for transmitting action potential from one cell body to the following cell bodies via signal lines 15 and 16. A resister 18 is provided as a synapse for connecting the axon and an action potential input of the cell body.

Figure 5:
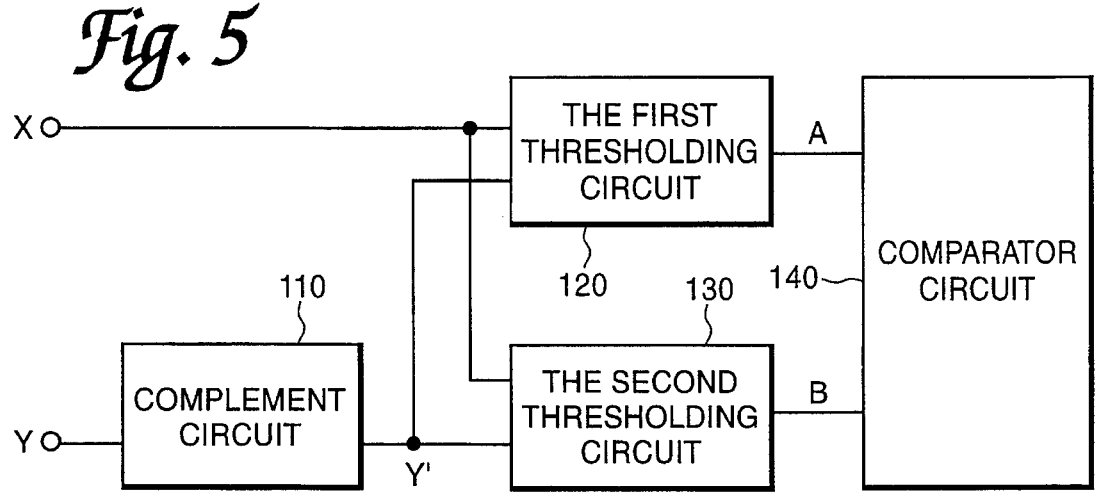
FIG. 5 is a block diagram showing a first embodiment of a comparator circuit.

FIG. 5 shows an embodiment of a comparator circuit that includes two thresholding circuits 120 and 130 and one complement circuit 110. Since subtraction is usually necessary for comparison, negative numbers have to be handled. However, in the present invention, a complement circuit is applied to the circuit of FIG. 5 in order to execute a comparison without negative number calculations.

Numbers X and Y to be compared are input to the comparator circuit as voltage signals; X is input to the first and second thresholding circuits 120 and 130, and Y is input to the complement circuit 110 which outputs a complement of Y to the circuits 120 and 130. When the numbers X and Y are of radix of "R", a complement Y' of the number Y is calculated as below.

$$Y'=R-Y-1 \quad (15)$$

and, $$\text{If } X+Y'>R-1 \text{ then } X>Y, \quad (16)$$

$$\text{If } X+Y'=R-1 \text{ then } X=Y, \text{ and} \quad (17)$$

$$\text{If } X+Y'<R-1 \text{ then } X<Y. \quad (18)$$

No negative number occurs in this calculation. Here, an octal number of R=8 is used, and the calculation result of X+Y' is shown in Table 1.

TABLE 1

| | | \multicolumn{8}{c}{X + Y' for X, Y, Y'} |
| | | \multicolumn{8}{c}{x} |
| Y | Y' | 0 | 1 | 2 | 3 | 4 | 5 | 6 | 7 |
|---|----|---|---|---|---|---|---|---|---|
| 0 | 7 | 7 | 8 | 9 | 10 | 11 | 12 | 13 | 14 |
| 1 | 6 | 6 | 7 | 8 | 9 | 10 | 11 | 12 | 13 |
| 2 | 5 | 5 | 6 | 7 | 8 | 9 | 10 | 11 | 12 |
| 3 | 4 | 4 | 5 | 6 | 7 | 8 | 9 | 10 | 11 |
| 4 | 3 | 3 | 4 | 5 | 6 | 7 | 8 | 9 | 10 |
| 5 | 2 | 2 | 3 | 4 | 5 | 6 | 7 | 8 | 9 |
| 6 | 1 | 1 | 2 | 3 | 4 | 5 | 6 | 7 | 8 |
| 7 | 0 | 0 | 1 | 2 | 3 | 4 | 5 | 6 | 7 |

Figure 6:
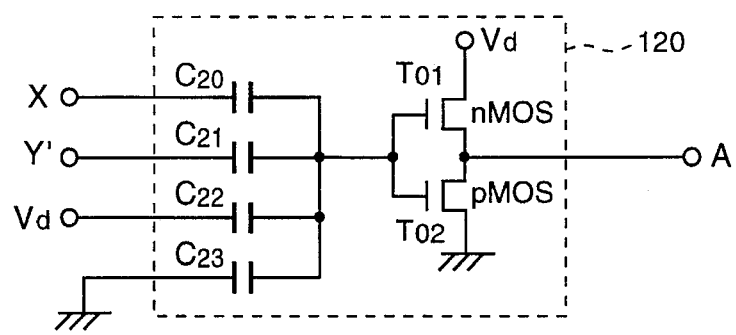
FIG. 6 is a circuit diagram of a thresholding circuit used in the circuit of FIG. 5.

FIG. 6 is a circuit diagram of the threshold circuit 120, which consists of capacitors C20, C21, C22 and C23 connected in parallel for capacitive coupling. X and Y' are connected to C20 and C21. C22 and C23 are connected to a reference voltage Vd and the ground, respectively. The capacitive coupling generates an output of, $$(C_{20}X + C_{21}Y + C_{22}Vd)/C_{20} + C_{21} + C_{22} + C_{23}) \qquad (19)$$

The output of the capacitive coupling is connected to a source follower consisting of an nMOS transistor T01 and a pMOS transistor T02. The drain of T01 is connected to a voltage Vd. The source of T01 is connected to the drain of T02, and the source of T02 is connected to ground. The output of the capacitive coupling is input to the gate of T01 and T02, and an output A is generated at a juncture between the source of T01 and drain of T02. The source follower has a threshold voltage corresponding to the radix itself "8". The output A is inversion voltage of Vd when the output of the capacitive coupling reaches the threshold voltage. Otherwise, it is not inverted so to be "0". The threshold circuit 130 is similar to, but different from the threshold voltage from the circuit 120.

The threshold voltage is less by one than the radix and output B is Vd when the output of the capacitive coupling is not less than the threshold and otherwise "0".

The outputs from the threshold circuits are input to a judgment circuit for performing the following judgment in Table 2.

TABLE 2

| Judgment by the judgment circuit | | |
|---|---|---|
| judgment | Output A | Output B |
| X > Y | 1(Vd/inverted) | 1(Vd) |
| X = Y | 1 | 0 |
| X < Y | 0 | 0 |

The judgment circuit may be a conventional logical circuit.

Figure 7:
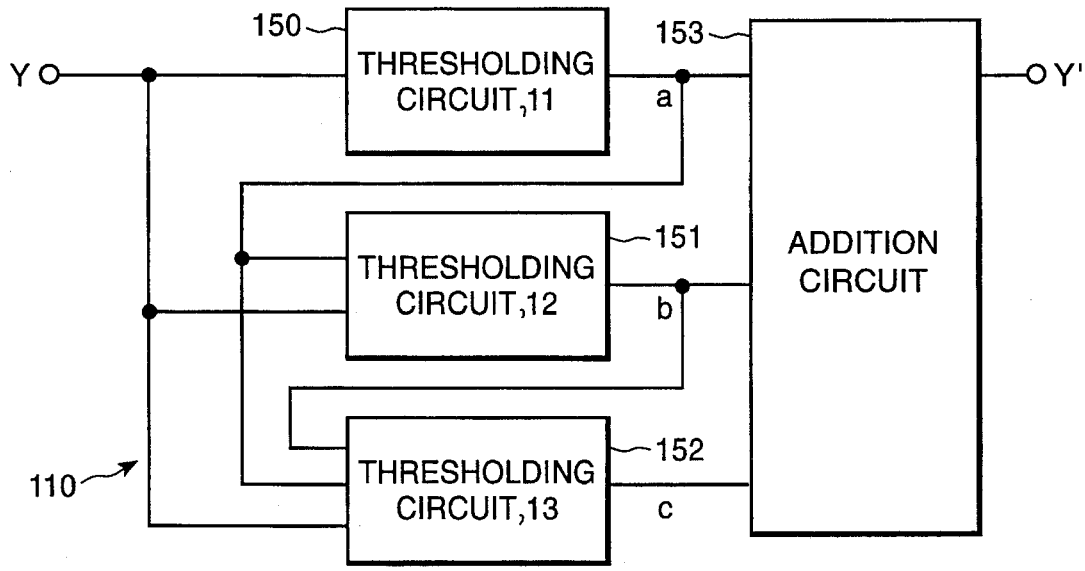
FIG. 7 is a complement circuit using the circuit shown in FIG. 5, FIGS. 8(a)–8(c) illustrate the thresholding circuits of the circuit in FIG. 7.

The complement circuit consists of a plurality of thresholding circuits 150, 151 and 152, as shown in FIG. 7, which output Vd as "1" when the input exceeds their threshold. The thresholds are "4", "2" and "1" for the circuits 150, 151 and 152, respectively. The circuits output a, b and c to an addition circuit 153 which calculates a weighted addition of a, b and c so that the input is converted into a octal number as well as converted into a complement of the octal number. Table 3 shows a relationship between the input Y and octal number.

TABLE 3

| analog voltage Y and octal number and complement | | |
|---|---|---|
| Y | octal number | complement |
| 0 ≦ A < Vd/8 | 0 | 7 |
| Vd/8 ≦ A < 2Vd/8 | 1 | 6 |
| 2Vd/8 ≦ A < 3Vd/8 | 2 | 5 |
| 3Vd/8 ≦ A < 4Vd/8 | 3 | 4 |
| 4Vd/8 ≦ A < 5Vd/8 | 4 | 3 |
| 5Vd/8 ≦ A < 6Vd/8 | 5 | 2 |
| 6Vd/8 ≦ A < 7Vd/8 | 6 | 1 |
| 7Vd/8 ≦ A < 8Vd/8 | 7 | 0 |

The threshold circuits 150, 151 and 152 correspond to bits of MSB, the second bit and LSB, and each circuit receives outputs of upper bit circuits together with Y. The connection of each threshold circuit has weights for inputs so that its output is inverted or not inverted in response to Y.

Figure 8A:
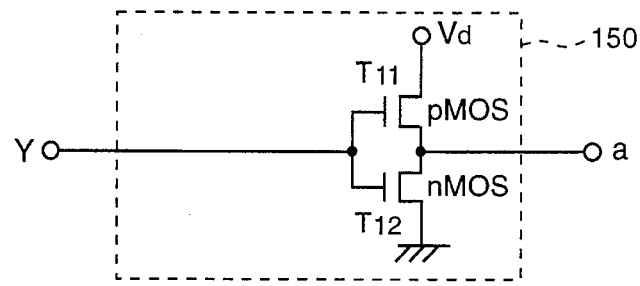

In FIG. 8(a), the threshold circuit 150 has a source follower which receives Y, and outputs Vd when Y is not less than the threshold Vd/2 and "0" otherwise.

Figure 8B:
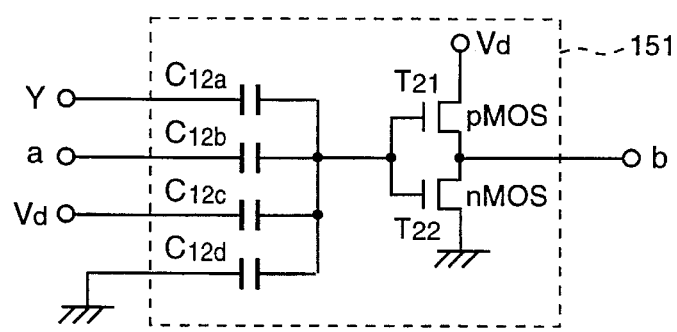

In FIG. 8(b), the threshold circuit 151 has a capacitive coupling connected to Y, a, Vd and ground, with weights 4:2:1:1, respectively. The output of the capacitive coupling is input to a source follower with the same threshold of Vd/2.

Figure 8C:
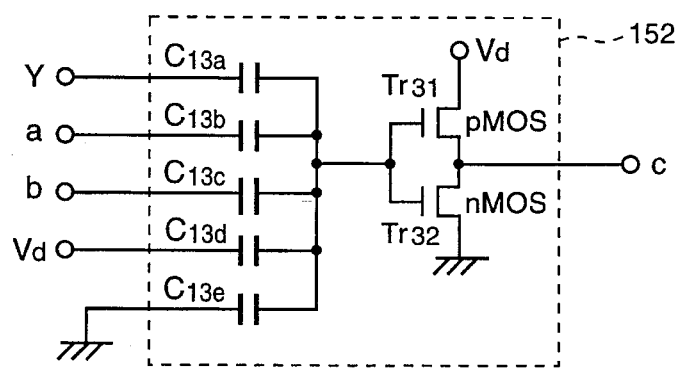

In FIG. 8(c), the threshold circuit 152 has a capacitive coupling connected to Y, a, b, Vd and ground, with weights 8:4:2:1:1, respectively. The output of the capacitive coupling is input to a source follower with the same threshold of Vd/2. The outputs a, bb and c are shown in Table 4, 5 and 6. In Tables, the outputs from the capacitive couplings are shown in Vout151 and Vout152 for the circuit 151 and 152.

TABLE 4

| Outputs of Thresholding Circuit 150 and Input Y | | | | | | | | | |
|---|---|---|---|---|---|---|---|---|---|
| Input Y | 0 | 1/8 | 2/8 | 3/8 | 4/8 | 5/8 | 6/8 | 7/8 | 8/8 |
| Output a | 1 | 1 | 1 | 1 | 1 | 0 | 0 | 0 | |

TABLE 5

| Outputs of Thresholding Circuit 151 and Input Y | | | | | | | | | | |
|---|---|---|---|---|---|---|---|---|---|---|
| Input | 4 × Y | 0 | 0.5 | 1 | 1.5 | 2 | 2.5 | 3 | 3.5 | 4 |
| Input | 2 × a | 2 | 2 | 2 | 2 | 2 | 0 | 0 | 0 | 0 |
| Vd | | 1 | 1 | 1 | 1 | 1 | 1 | 1 | 1 | 1 |
| Vout151 | | 3/8 | 3.5/8 | 4/8 | 4.5/8 | 5/8 | 3.5/8 | 4/8 | 4.5/8 | 5/8 |
| Output b | | 1 | 1 | 0 | 0 | 1 | 1 | 0 | 0 | |

TABLE 6

| Outputs of Thresholding Circuit 152 and Input Y | | | | | | | | | | |
|---|---|---|---|---|---|---|---|---|---|---|
| Input | 8 × Y | 0 | 1 | 2 | 3 | 4 | 5 | 6 | 7 | 8 |
| Input | 4 × a | 4 | 4 | 4 | 4 | 4 | 0 | 0 | 0 | 0 |
| Input | 2 × b | 2 | 2 | 2 | 0 | 0 | 2 | 2 | 0 | 0 |
| Vd | | 1 | 1 | 1 | 1 | 1 | 1 | 1 | 1 | 1 |
| Vout152 | | 7/16 | 8/16 | 9/16 | 8/16 | 9/16 | 8/16 | 9/16 | 8/16 | 9/16 |
| Output c | | 1 | 0 | 1 | 0 | 1 | 0 | 1 | 0 | |

Figure 9:
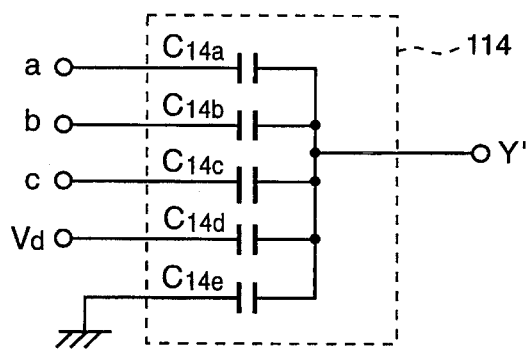
FIG. 9 illustrates an addition circuit of the circuit of the circuit in FIG. 7.

The addition circuit 153 is shown in FIG. 9. A capacitive coupling is provided for weighted addition of a, b, c and Vd with weights provided by capacitors C14a, C14b, C14c, C14d and C14e. The capacitances of these capacitors are 8:4:2:1:1 in ratio. Table 7 shows the addition result of the circuit 114.

TABLE 7

| Outputs of Addition Circuit 152 | | | | | | | | | |
|---|---|---|---|---|---|---|---|---|---|
| Input | Y | 0 | 1/8 | 2/8 | 3/8 | 4/8 | 5/8 | 6/8 | 7/8 | 8/8 |
| Input | 8 × a | 8 | 8 | 8 | 8 | 0 | 0 | 0 | 0 |
| Input | 4 × b | 4 | 4 | 4 | 4 | 4 | 0 | 0 | 0 |
| Input | 2 × c | 2 | 2 | 2 | 0 | 0 | 2 | 2 | 0 |
| Vd |  | 1 | 1 | 1 | 1 | 1 | 1 | 1 | 1 |
| Output | Y' | 15/16 | 13/16 | 11/16 | 9/16 | 7/16 | 5/16 | 3/16 | 1/16 |

The output Y' is defined as an intermediate value between the threshold value of Y in order to prevent errors in the circuit following to the addition circuit. If it is defined as the threshold values, the judgment becomes uneasy whether the value is more or less than a threshold due to noises. The addition is accurately performed under the condition that the current on the output is nearly "0". AMOS source follower should be connected to the output if the output impedance is not sufficiently low.

The threshold level of the above inverters are Vd/2 commonly and the ratio of capacitances are defined for uniform step size of the quantization. When the quantization steps are not equal, the capacitance ratio is different from the above.

Figure 10:
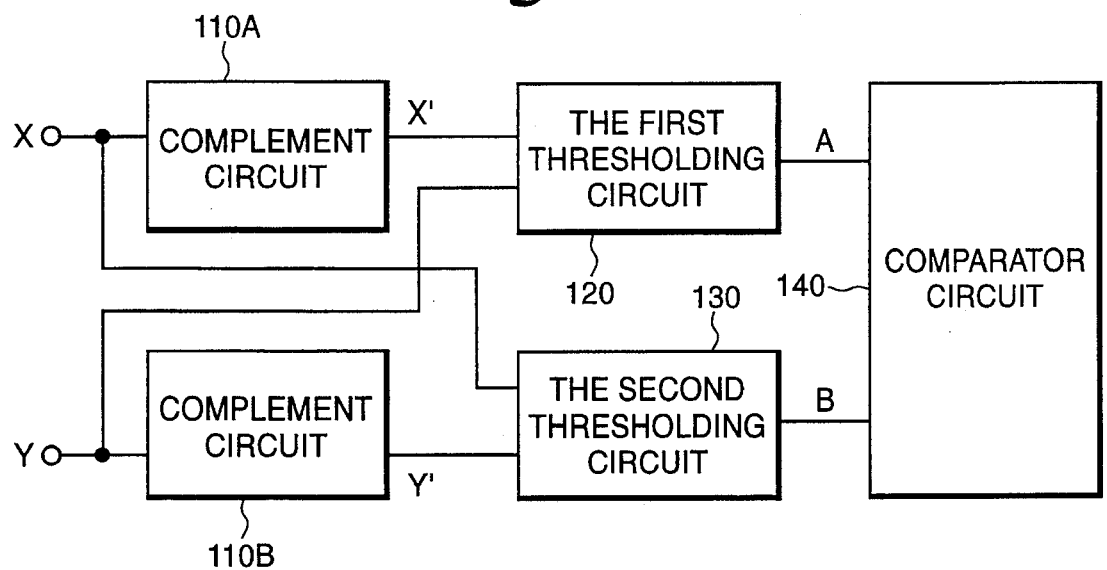
FIG. 10 illustrates a second embodiment of a comparator circuit.

FIG. 10 shows the fourth embodiment of comparator circuit which has an addition complement circuit for the threshold circuit 120. There are two complement circuits 110A and 110B for the thresholding circuits 120 and 130, respectively. The thresholding circuits have threshold voltages corresponding to the maximum threshold for quantizing, that is, the multi-value of "7". According to this circuit, the following judgment is performed. Here, X=Y if both outputs A and B are inverted, X<Y if the output A is inverted, and X>Y if B is inverted.

TABLE 8

| Judgment by the Judgment Circuit | | |
|---|---|---|
| judgment | output A | output B |
| X > Y | 0 | 1 |
| X = Y | 1 | 1 |
| X < Y | 1 | 1 |

Both threshold circuits 120 and 130 have the threshold values of "7", which is different from the third embodiment in which the circuit 120 has of threshold "8". Therefore, the fourth embodiment has advantages in manufacturing because less threshold levels are used.

Figure 11:
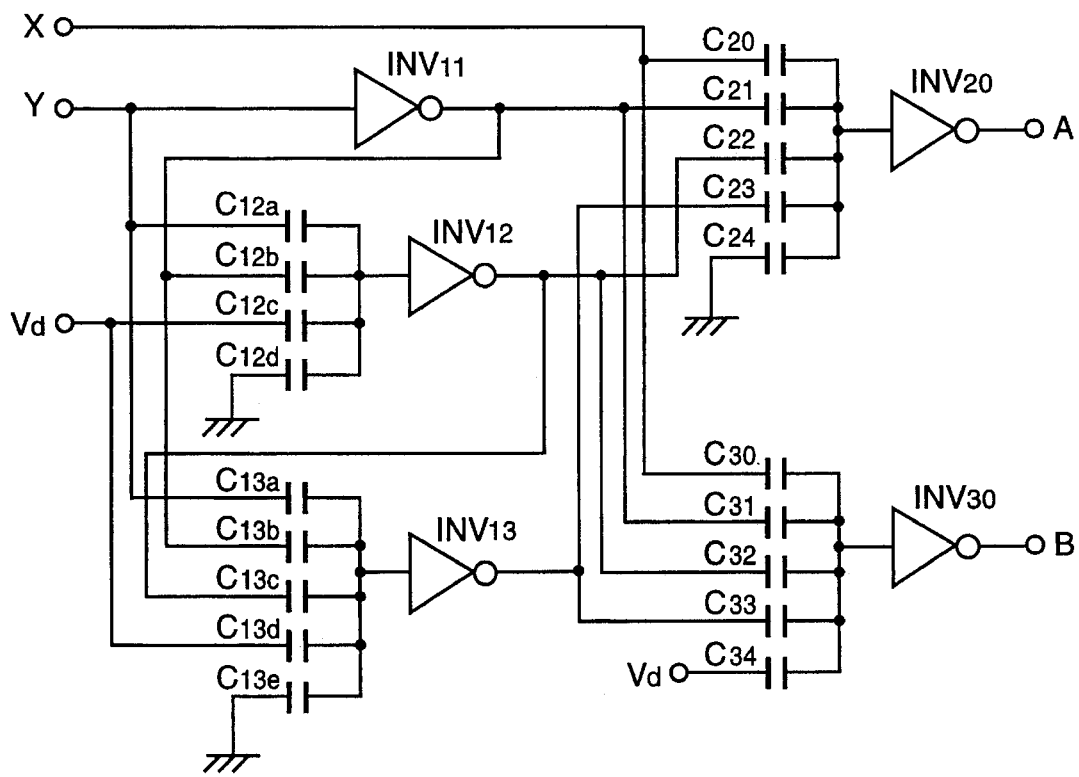
FIG. 11 illustrates a third embodiment of a comparator circuit.

FIG. 11 is the fifth embodiment of comparator circuit with similar function to that of the circuit of FIG. 5, in which the circuit is simplified. Outputs from a portion corresponding to the above complement circuit are connected in parallel and directly input to capacitances of the first and second thresholding circuits. The portion consists of an inverter INV11 corresponding to the thresholding circuit 150, a combination of INV12 and capacitors C12a, C12b, C12c and C12d corresponding to the thresholding circuit 151, and a combination of INV13 and capacitors C13a, C13b, C13c, C13d and C13e corresponding to the thresholding circuit 152.

The portion of the circuit in FIG. 11 corresponding to the thresholding circuit 120 consists of an inverter INV20 and capacitors C20, C21, C22, C23 and C24 commonly connected at their output terminal to an input of INV20. C20, C21, C22, C23 and C24 are connected to X, an output of INV11, an output of INV12, an output of INV13 and ground, respectively. These capacitors have capacitance ratios of 8:4:2:1:1. INV20 inverts the input when the input exceeds "8".

The portion of the circuit in FIG. 11 corresponding to the thresholding circuit 130 consists of an inverter INV30 and capacitors C30, C31, C32, C33 and C34 commonly connected at their output terminal to an input of INV30. C30, C31, C32, C33 and C34 are connected to X, an output of INV11, an output of INV12, an output INV13 and Vd, respectively. These capacitors have capacitance ratios of 8:4:2:1:1. INV20 inverts the input when the input exceeds "7". This circuit has output characteristics of Table 2 above.

Next, a computational circuit for quantizing is described.

Figure 12:
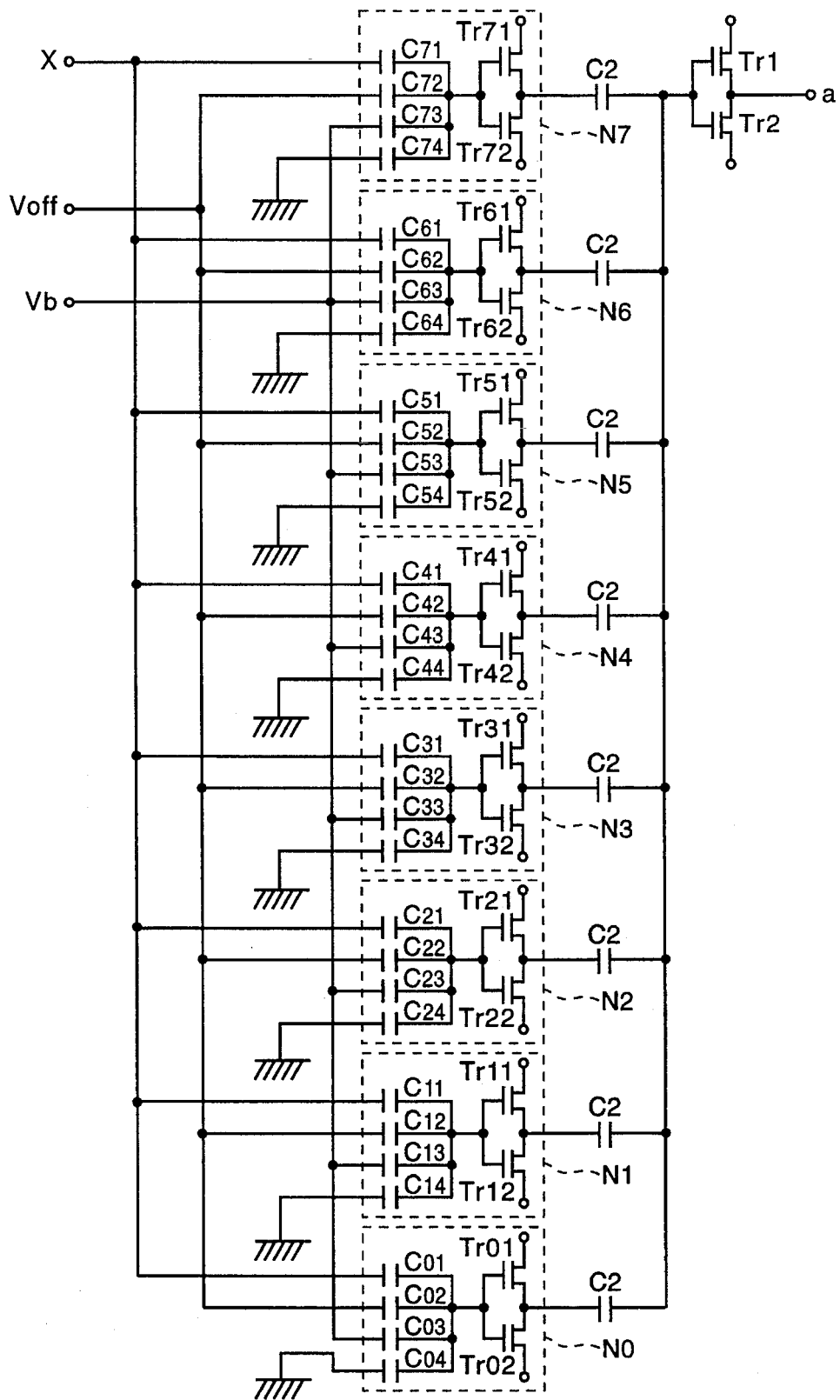
FIG. 12 is a circuit diagram of a first embodiment of a quantizing circuit.

FIG. 12 shows a first embodiment of a quantizing circuit that includes a plurality of thresholding circuits N0 to N7 connected in parallel. An input voltage X, an offset voltage Voff and a reference voltage Vb are input to each thresholding circuit.

Each thresholding circuit consists of four parallel capacitances and an amplifying circuit of two MOS transistors. The thresholding circuit N0 has capacitances C01, C02, C03 and C04 connected to X, Voff, Vb and ground, at one terminal, respectively. The capacitances are commonly connected at their other terminals to the amplifying circuit. The amplifying circuit has a nMOS transistor Tr01, wherein a drain of Tr01 is connected to a bias voltage Vdd and the source is connected to a source of transistor Tr02. Vdd is commonly connected to the thresholding circuits so that the output voltages are equal to one another when the thresholding circuits receive a voltage more than the threshold. Gates of Tr10 and TRO2 are commonly connected to ground voltage Vss.

Capacitors C01, C11, C21, C31, C41, C51, C61 and C71 for receiving X have equal capacitances. C02, C12, C22, C32, C42, C52, C62 and C72 for receiving Voff are also equal to one another. Voff is set such that the threshold voltages are lifted and the quantization ranges are shifted. When Voff is high, the thresholding circuit generates outputs by low input voltages. The capacitances of capacitors C03, C13, C23, C33, C43, C53, C63 and C73 are provided in a stepwise fashion so that the thresholding circuits' output is changed from inverted to non-inverted one after another in response to the input voltage. The grounded capacitors have capacitances that are selected so as to cancel the change in capacitance of the capacitors connected to Vb. The following formula is obtained for generalized capacitances and the output of the capacitive coupling $$Ck0 + Ck1 + Ck2 + Ck3 = K (K = \text{constant}) \tag{19}$$

$$Vc = (Ck0X + Ck1Voff + Ck2Vb)/(Ck0 + Ck1 + Ck2 + Ck3) \tag{20}$$

The threshold can be changed by changing the capacitance of Ck2 without changing Ck3. However, the denominator as well as numerator are changed in formula (20) by adjusting Ck3, so that thresholding circuits have different capacities from one another. However, will cause difficulty in designing and using the quantizing circuit.

Figure 13:
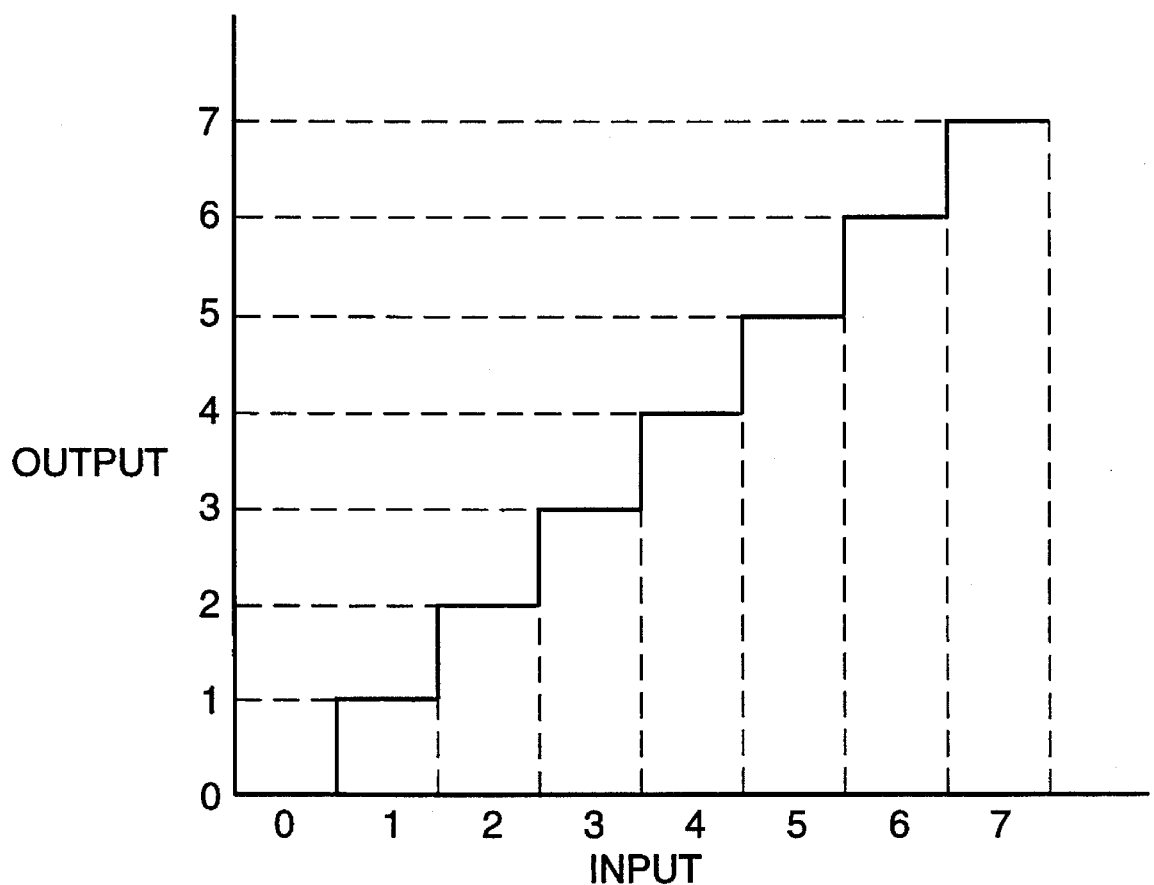
FIG. 13 is an input/output characteristics of the circuit in FIG. 12.

The outputs of threshold circuits N1 to N7 are connected to capacitors having the same capacitance, which are in turn commonly connected to a source follower. The source follower consists of nMOS transistors Tr1 and pMOS transistors Tr2. The source follower outputs a quantized signal a. The offset voltage Voff is 2.5 V in this embodiment. The quantization function is described with reference to Table 9 and FIG. 13.

TABLE 9

| | Quantization Result | |
|---|---|---|
| Input Voltage X | Multi-value | Output a |
| X ≧ 6.0 | 7 | Vdd |
| 6.0 > X ≧ 5.5 | 6 | 7Vdd/8 |
| 5.5 > X ≧ 5.0 | 5 | 6Vdd/8 |
| 5.0 > X ≧ 4.5 | 4 | 5Vdd/8 |
| 4.5 > X ≧ 4.0 | 3 | 4Vdd/8 |
| 4.0 > X ≧ 3.5 | 2 | 3Vdd/8 |
| 3.5 > X ≧ 3.0 | 1 | 2Vdd/8 |
| 3.0 > X ≧ 2.5 | 0 | Vdd/8 |
| 2.5 > X | | |

When X is equal to or more than 2.5 V, the threshold circuit N7 fires, i.e., generates an output, then N6 to N0 successively fire at every increase of 0.5 V. One thresholding circuit outputs Vdd on firing, the output voltage is k×Vdd when k threshold circuits fire. The quantizing steps are equally defined as shown in Table 9 and FIG. 40. There are eight quantization levels which are provided by eight thresholding circuits. However, more levels can be obtained by using more circuits. Capacitors C2 on the output side of circuits N0–N7 may have different capacitances to obtain another type of quantization steps.

Figure 14:
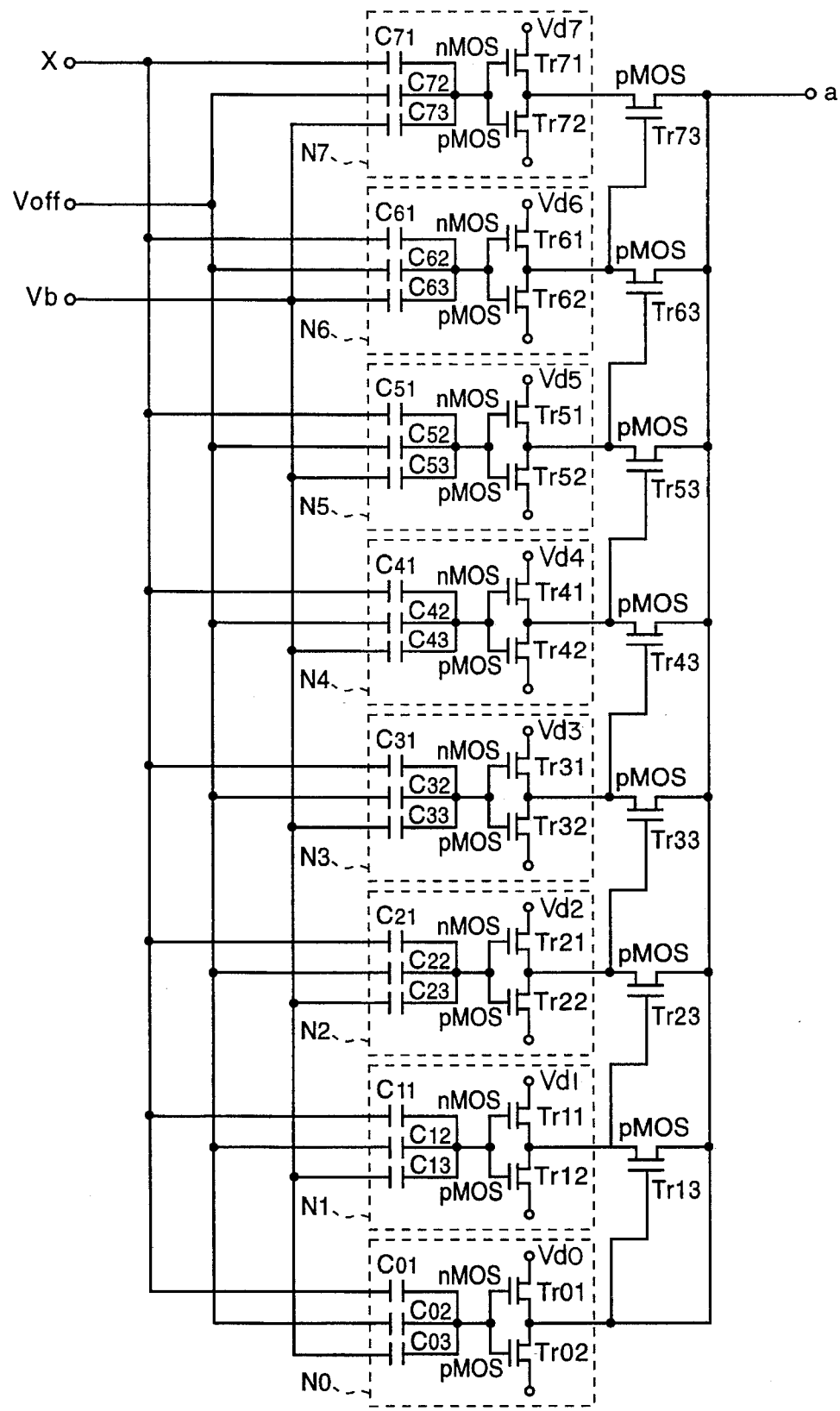
FIG. 14 is a circuit diagram of the second embodiment of a quantizing circuit.

FIG. 14 illustrates a second embodiment of quantizing circuit which is different from the first embodiment in that the grounded capacitances are omitted in the thresholding circuits and pMOS switching circuits Tr13 to Tr73 are connected to the output of the thresholding circuits. Each switching circuit cuts the output of an associated thresholding circuit of lower threshold off when another thresholding circuit fires. Therefore, only one thresholding circuit having highest threshold generates an output upon receiving an input that is greater than the threshold. The quantizing characteristics are shown in Table 10.

TABLE 10

| | Quantization Result | | |
|---|---|---|---|
| Input Voltage X | Multi-value | Output | Output Voltage |
| X ≧ 3.00 | 7 | Vd0 | 6.00 V |
| 3.00 > X ≧ 2.75 | 6 | Vd | 5.50 V |
| 2.75 > X ≧ 2.50 | 5 | Vd2 | 5.00 V |
| 2.50 > X ≧ 2.25 | 4 | Vd3 | 4.50 V |
| 2.25 > X ≧ 2.00 | 3 | Vd4 | 4.00 V |
| 2.00 > X ≧ 1.75 | 2 | Vd5 | 3.50 V |
| 1.75 > X ≧ 1.50 | 1 | Vd6 | 3.00 V |
| 1.50 > X ≧ 1.25 | 0 | Vd7 | 2.50 V |
| 1.25 > X | | | |

The output is infinite when the input is less than 1.25 V, but all thresholding circuits fire. Then N6 to N0 successively fire on every increase of X by 0.25 V. When 1.50>X≧1.25, the output voltage is 2.5 V as an output of N7. When 1.75>X≧1.50, then output voltage is 3.00 V because N7 and N6 fire but N6 cuts Tr73 off, then an output of N6 becomes output a. When X≧3.00, the output voltage is 6.00 V because Tr03 to Tr73 are cut off and only N0 generates an output.

The third embodiment of quantizing circuit is described hereinafter.

Figure 15:
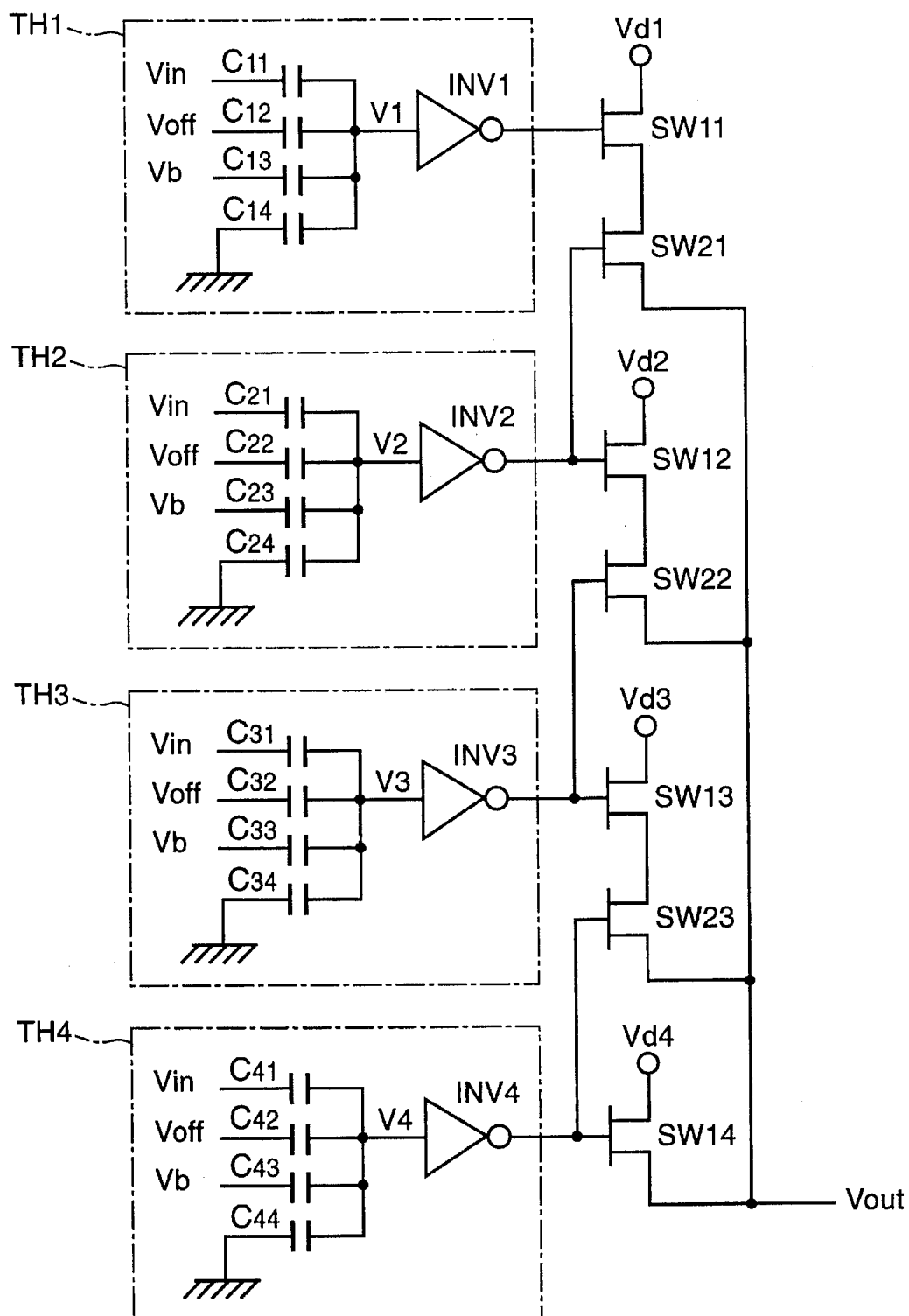
FIG. 15 is a circuit diagram of the third embodiment of a quantizing circuit.

FIG. 15 shows a quantizing circuit including a plurality of thresholding circuits TH1 to TH4 which have stepwise threshold levels from the lowest to the highest, respectively. Outputs of the circuits TH1 to TH4 are input to the first switching means SW11 to SW14, respectively. Each switching means is opened when the corresponding thresholding circuit generates an output. A voltage source is connected to the first terminal of each switching means so that the voltage of the voltage source is introduced to the second terminal of the switching means when it is closed. The second terminal of the switching means SW11 to SW13 are connected to the second switching means SW21 to SW23, respectively. The outputs of TH2 to TH4 are input to SW21 to SW23 so as to open SW21 to SW23. The first and second switching means have opposite polarities. For example, SW11 to SW14 consist of pMOS and SW21 to SW24 consist of an nMOS. The outputs of SW21 to SW24 are connected to a common output terminal Vout.

Each of the thresholding circuits TH1 to TH4 has input terminals for receiving an input voltage Vin, an offset voltage Voff, a bias voltage Vb and for connecting TH1 to TH4 to ground. TH1 has a capacitive coupling with parallel capacitors C11 to C14 and an inverting amplifier INV1. C11 to C14 are connected to Vin, Voff, Vb and ground, respectively. The capacitive coupling generates an output V1 which is input to INV1, as follows.

$$V1 = (C11Vin + C12Voff + C13VB)/(C11 + C12 + C13 + C14) \quad (21)$$

INV1 outputs a low level voltage when V1 is more than a threshold voltage Vth. This condition is expressed by the following formula.

$$Vin > \{Vth(C11 + C12 + C13 + C14) - (C12Voff + C13Vb)\}/C11 \quad (22)$$

The term C12Voff is determined so as to cancel an offset of TH1. C14 is designed so that the multiplier (C11+C12+C13+C14) of Vth is constant for various C13. When a reference threshold Vth0 is defined, thresholds Vth1 to Vth4 for TH1 to TH4 are defined below, respectively.

$$Vth1 = Vth0 \quad (23)$$

$$Vth2 = 2 \times Vth0 \quad (24)$$

$$Vth3 = 3 \times Vth0 \quad (25)$$

$$Vth4 = 4 \times Vth0 \quad (26)$$

then, the following formulas are obtained.

$$C13 = Ct - 1 \times C11(Vth0/Vb) \quad (27)$$

$$C23 = Ct - 2 \times C11(Vth0/Vb) \quad (28)$$

$$C33 = Ct - 3 \times C11(Vth0/Vb) \quad (29)$$

$$C43 = Ct - 4 \times C11(Vth0/Vb) \quad (30)$$

$$Ct = \{Vth(C11 + C12 + C13 + C14) - C12Voff\}/Vb \quad (31)$$

The compensation of C13 by means of C14 simplifies the design of thresholds of TH1 to TH4.

Figure 16:
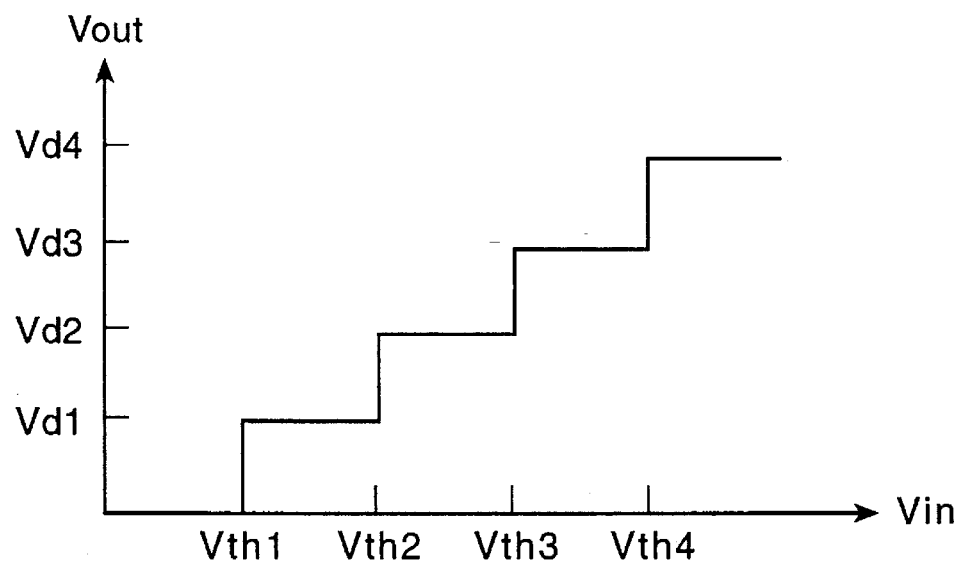
FIG. 16 is a graph of the input/out characteristics of the circuit in FIG. 15.

TH1 generates a low output when Vin=Vth1 to SW11 close which introduces Vd1 at the drain of SW11 to SW21. At that time, SW21 is also conductive due to the low output of TH2, so Vd1 is output from SW2 as is. SW13 and SW14 are opened because TH3 and TH4 do not generate low output. As a result, only Vd1 is output as the common output. Therefore, Vout=Vd1. When Vin is increased to Vth2, SW21 is opened by the output of TH2 and SW12 is closed. At that time, SW22 is conductive because TH3 does not generate a low level, so Vd2 is output as is. Similarly, Vd3 and Vd4 are successively output as Vin increases to Vth3 and Vth4. The output characteristics above are shown below and in FIG. 16.

If $Vth4 \leq Vin < Vd4$ then $Vout=Vd4$ (32)

If $Vth3 \leq Vin < Vd4$ then $Vout=Vd3$ (33)

If $Vth2 \leq Vin < Vd3$ then $Vout=Vd2$ (34)

If $Vth1 \leq Vin < Vd2$ then $Vout=Vd1$ (35)

Figure 17:
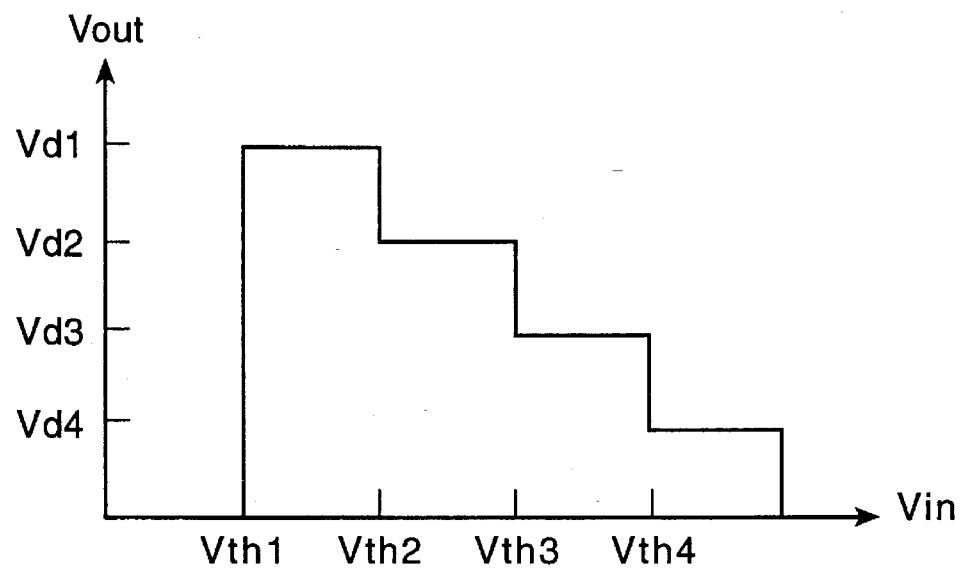
FIG. 17 is another graph of the input/output characteristics of the circuit in FIG. 15.

The characteristics may be a monotonous decreasing characteristic as in FIG. 17 or not monotonous, instead of the monotonical increasing characteristics from above.

What is claimed is:

1. A computational circuit comprising:

a plurality of inverters having equal thresholds, each inverter in said plurality of inverters having an input terminal;

a plurality of capacitive couplings, each capacitive coupling having two input terminals, a different capacitor associated with each input terminal and a common output terminal, said common output terminal of each capacitive coupling being operatively connected to said input terminal of one of said inverter so that a combination of one capacitive coupling and an associated inverter defines a thresholding circuit, said input terminals of said capacitive couplings being operatively connected at all times during operation of the computational circuit to an analog input voltage and a reference voltage, said capacitors of said plurality of capacitive couplings having different capacitances so that each thresholding circuit has a different threshold; and a second common output terminal receiving outputs of said plurality of inverters so that a quantization of said analog input voltage is provided at said second common output terminal.

2. A computational circuit as claimed in claim 1, further comprising:

a plurality of first switching circuits each of which is operatively connected between an output of one of said inverters and said second common output terminal so as to be actuated responsive to a corresponding inverter generates an inverted output;

a plurality of voltage sources providing different voltages, each of said voltage sources being connected to one of said first switching circuits; and a plurality of second switching circuits, said second switching circuits being operatively connected to two of said thresholding circuits such that each of said second switching circuits actuated by an inverted output of a thresholding circuit having a higher threshold than a remaining other thresholding circuit to which that second switching circuit is connected.

3. A computational circuit as claimed in claim 1, further comprising a first switching element connected to an output of two of said inverters such that an output of one of said two inverters controls whether an output of a remaining of one of said two inverters is provided to said second common output terminal via said first switching element.

* * * * *